United States Patent
Jones et al.

(10) Patent No.: US 7,085,017 B1
(45) Date of Patent: Aug. 1, 2006

(54) POLAR HALFTONE METHODS FOR RADIAL PRINTING

(75) Inventors: Randy Q. Jones, Sunnyvale, CA (US); Jan E. Unter, Danville, CA (US)

(73) Assignee: Elesys, Inc., Sunnyvale, CA (US)

( * ) Notice: Subject to any disclaimer, the term of this patent is extended or adjusted under 35 U.S.C. 154(b) by 817 days.

(21) Appl. No.: 10/207,662

(22) Filed: Jul. 26, 2002

Related U.S. Application Data

(60) Provisional application No. 60/310,303, filed on Aug. 3, 2001.

(51) Int. Cl.
*H04N 1/405* (2006.01)
*G06K 15/00* (2006.01)

(52) U.S. Cl. ............... 358/3.2; 358/3.06; 358/3.11; 358/3.3

(58) Field of Classification Search ........... 358/1.2, 358/3.2, 3.06, 3.11, 3.29–3.3; 347/2; 345/694–695, 345/596, 598–599
See application file for complete search history.

(56) References Cited

U.S. PATENT DOCUMENTS

| | | | |
|---|---|---|---|
| 4,051,536 A | 9/1977 | Roestling | 358/298 |
| 4,149,194 A | 4/1979 | Holladay | 358/283 |
| 4,185,304 A | 1/1980 | Holladay | 358/298 |
| 4,339,774 A | 7/1982 | Temple | 358/283 |
| 4,413,286 A | 11/1983 | Boston | 358/283 |
| 5,274,473 A | 12/1993 | Kidd et al. | 358/458 |
| 5,285,291 A | 2/1994 | Schiller | 358/453 |

*Primary Examiner*—Mark Zimmerman
*Assistant Examiner*—Jacob P. Rohwer
(74) *Attorney, Agent, or Firm*—Beyer Weaver & Thomas, LLP

(57) ABSTRACT

Disclosed are apparatus and methods for implementing polar halftone techniques that substantially reduce or eliminate interference patterns while printing on rotating circular media with a radial print system. In one embodiment, Cartesian image pixels are selected such that screen pixels or "dots" are arranged fan-shaped along radii (or "spokes") and in annular ring segments (or "arcs"). Halftone sampling frequency may be varied along spokes and arcs or along a polynomial curve relative to the center of spinning media, in order to reduce distortion and artifacts.

9 Claims, 10 Drawing Sheets

POLAR HALFTONE METHODS FOR RADIAL PRINTING

CROSS REFERENCE TO RELATED APPLICATIONS

This application takes priority under U.S.C. 119(e) of U.S. Provisional Application No. 60/310,303, filed 3 Aug. 2001. This application is also related to co-pending U.S. Pat. No. 6,264,295, issued 24 Jul. 2001. These applications and patent are incorporated herein by reference in their entirety for all purposes.

FIELD OF THE INVENTION

The present invention relates to fluid dispensing devices and methods for printing on spinning circular media. More particularly, it concerns mechanisms for applying halftone screens in angular and radial directions to printing with minimal image distortion on rotating circular media discs.

BACKGROUND OF THE INVENTION

In the art of dispensing fluidic ink objects as it applies to radial printing, there is a need to place ink objects accurately and precisely onto the spinning circular media to effectively use the mechanisms of radial printing. Radial printing, as referenced above in U.S. Pat. No. 6,264,295, in Bradshaw et al, generally includes the process of dispensing ink onto a media at a particular radius of the media and a particular angular position while the media is rotating. During the radial printing process, inks are dispensed to the rotating media in a predetermined manner based upon selection of available points in a print image and correcting for errors resulting from the Cartesian-to-polar conversion process.

FIG. 2 illustrates a radial printing system 200, as described in Bradshaw et al, used to print on circular media 210 as it rotates 214. Host computer 270 runs imaging algorithms 272 that compute, among other things, Cartesian-to-polar conversion results 254, which are imaged 280 for use by the pen control system 250. While angular position is synchronized 230 by encoder 240 the motor 260 rotates and the pen control system fires ink jet pen 220, such that ink objects 212 impinge at target radii 216 along radial axis 218 and angle 226 during rotation 214. A radial print system must accommodate continuously widening ink object dispersion with increasing radial position, necessitating the use of a polar coordinate mapping techniques. In doing so, the number of ink objects 212 printed increases proportionately with the radius, as the pen moves radially 216 outward and each increasingly larger annular ring is printed.

In conventional Cartesian printing systems, halftone screening is used to generate varying levels of intensity or to print grayscale or color images. As shown in FIG. 1, traditional halftone techniques, widely known in the art and used for conventional Cartesian printers, assume a Cartesian printing environment in which intensity or dot density varies along the X-axis 112, Y-axis 110 or the screen sampling angle 114.

As discussed in Bradshaw et al, to facilitate printing radially, all Cartesian points must be first converted to polar coordinates. However, when Cartesian halftones undergo this conversion and are used with radial printing applications, the transformed halftones (as shown in FIG. 5) yield poor results on disc media 210 and often exhibit moiré interference patterns 510~520. The resulting moiré interference patterns during radial printing are distracting to the viewer, dominate the visage, and vary unpredictably with color, intensity, and hue. The polar conversion algorithms 272 (FIG. 2) used to prepare an image for radial printing attempts to select or sample as many qualified points from the Cartesian rendered image as possible, while adjusting for potential conversion errors. Moiré interference patterns result during Cartesian-to-polar conversion for radial printing when the polar sampling frequency beats directly with the original Cartesian halftone frequency or their harmonics. As a result, when used for radial printing applications, traditional Cartesian-based halftone techniques inherently cause moiré patterns and are thus usually not suitable for radial printing.

In view of the foregoing, halftone mechanisms which reduce or substantially eliminate interference patterns during radial printing are needed.

SUMMARY OF THE INVENTION

The present invention describes apparatus and methods for implementing polar halftone techniques that substantially reduce or eliminate interference patterns while printing on rotating circular media with a radial print system. In one embodiment, Cartesian image pixels are selected such that screen pixels or "dots" are arranged fan-shaped along radii (or "spokes") and in annular ring segments (or "arcs"). Halftone sampling frequency may be varied along spokes and arcs or along a polynomial curve relative to the center of spinning media, in order to reduce distortion and artifacts.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 11a and 11b is a flow chart illustrating a procedure for implementing the polar half-tone cells and associated screens in accordance with one embodiment of the present invention.

DETAILED DESCRIPTION OF SPECIFIC EMBODIMENTS

The present invention will now be described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

For the scope of the present invention, the terms "CD" and "media" are intended to mean all varieties of optical recording media discs, such as CD-R, CD-RW, DVD-R, DVD+R, DVD-RAM, DVD-RW, DVD+RW and the like.

The polar halftone generation methods and mechanisms described herein may be integrated within any suitable radial printer. Several embodiments of radial printers are further described in above referenced U.S. Pat. No. 6,264,295, entitled RADIAL PRINTING SYSTEM AND METHODS by George L. Bradshaw et al, issued Jul. 24, 2001, and co-pending U.S. patent application, having application Ser. No. 09/872,345, entitled LOW PROFILE INK HEAD CARTRIDGE WITH INTEGRATED MOVEMENT MECHANISM AND SERVICE-STATION, by Randy Q. Jones et al., filed Jun. 1, 2001. These referenced applications are incorporated herein by reference in their entirety for all purposes.

Figure 2:
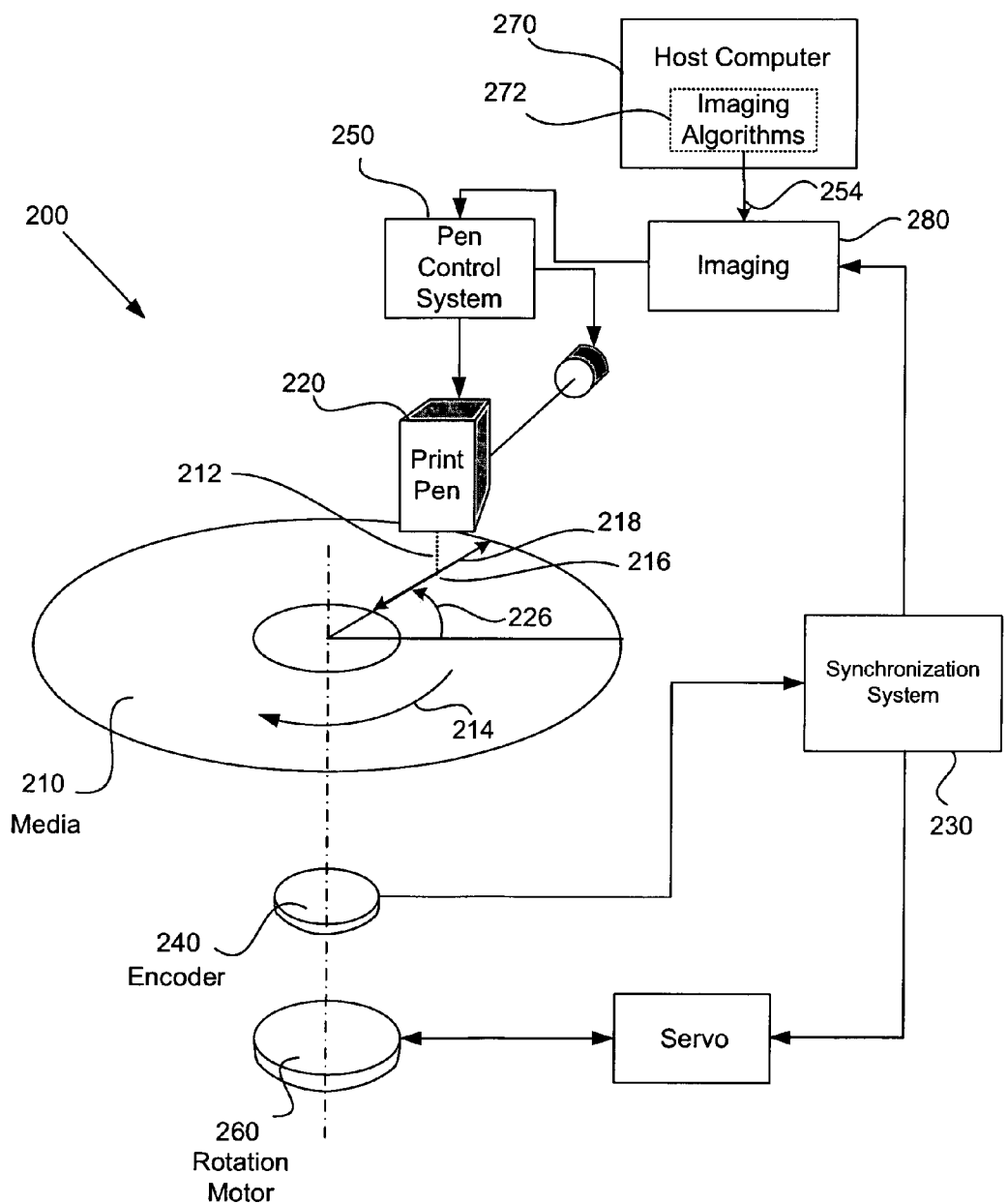
FIG. 2 is a diagrammatic representation of a radial printing system.
Figure 3:
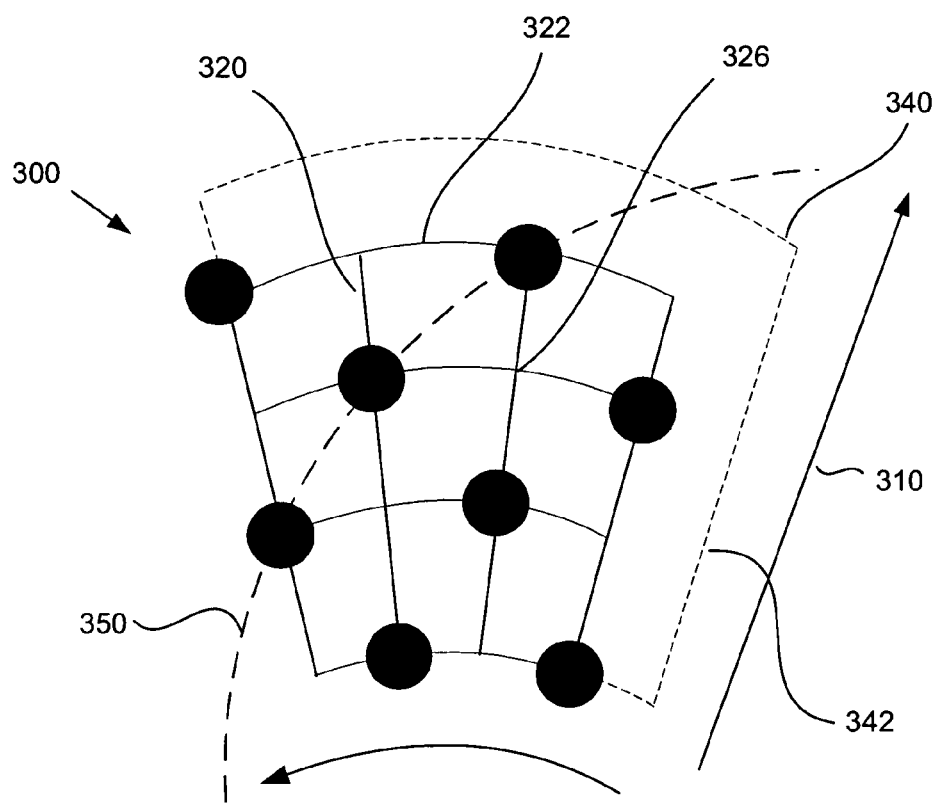
FIG. 3 represents a polar halftone cell illustrating "spokes," "arcs" and inter-cell spacing having a screen pattern in accordance with one embodiment of the present invention.

In the present invention, the term, "polar halftone," is used to describe halftones formed by the use of one or more halftone cells in the shape of a two-dimensional, fan-shaped, annular wedges consisting of radial "spokes" and annular segment "arcs" 322, defining their boundaries, as shown in FIG. 3. Spokes 320 and arcs 322 in the polar domain are analogous to the X-axis 112 and Y-axis 110 (FIG. 1) of conventional printer halftones in the Cartesian domain, but significant differences exist. Where as in conventional Cartesian printing, halftone sample frequencies may vary along both the X-axis and Y-axis directions, in the radial printing environment, halftone sample frequencies instead vary along the radial spoke and arc directions. The present invention enables the printing of lower-distortion halftones within the polar coordinate environment. Using a radial printing mechanism as shown in FIG. 2, the radial printhead 210 is positioned above rotating circular media 220. As a direct result and benefit, moiré interference patterns are substantially eliminated, because the limitations of Cartesian sampling frequencies and beating interference patterns are minimized or eliminated in the radial printing polar environment.

Referring to FIG. 3, a polar halftone cell ("cell") 300 is defined as an arbitrary wedge-shaped grid in the polar coordinate system, circumscribing a plurality of lines radiating from the media center along the radial direction, termed "spokes," 320, and a plurality of annular arc-like segments, termed "arcs" 322, selected from among segments of concentric rings of the same origin.

A wide variety of polar halftone cell "wedge" shapes may be constructed by the appropriate selections of spokes and arcs and coordinate transforms. In one embodiment, a 4 by 4 ("4×4") cell 300 is used, consisting of 4 spokes and 4 arcs, forming a wedge-shaped, fan-like dot array, whose boundaries are formed by selected spokes and arcs. A butting space 340 between adjacent cells is also left around the upper or lower cell ring and to one side or other of each cell. In the case as illustrated in FIG. 3, the butting space occupies the space to the outside 340 of the top arc 322 and to the right 342 of the cell.

Figure 8:
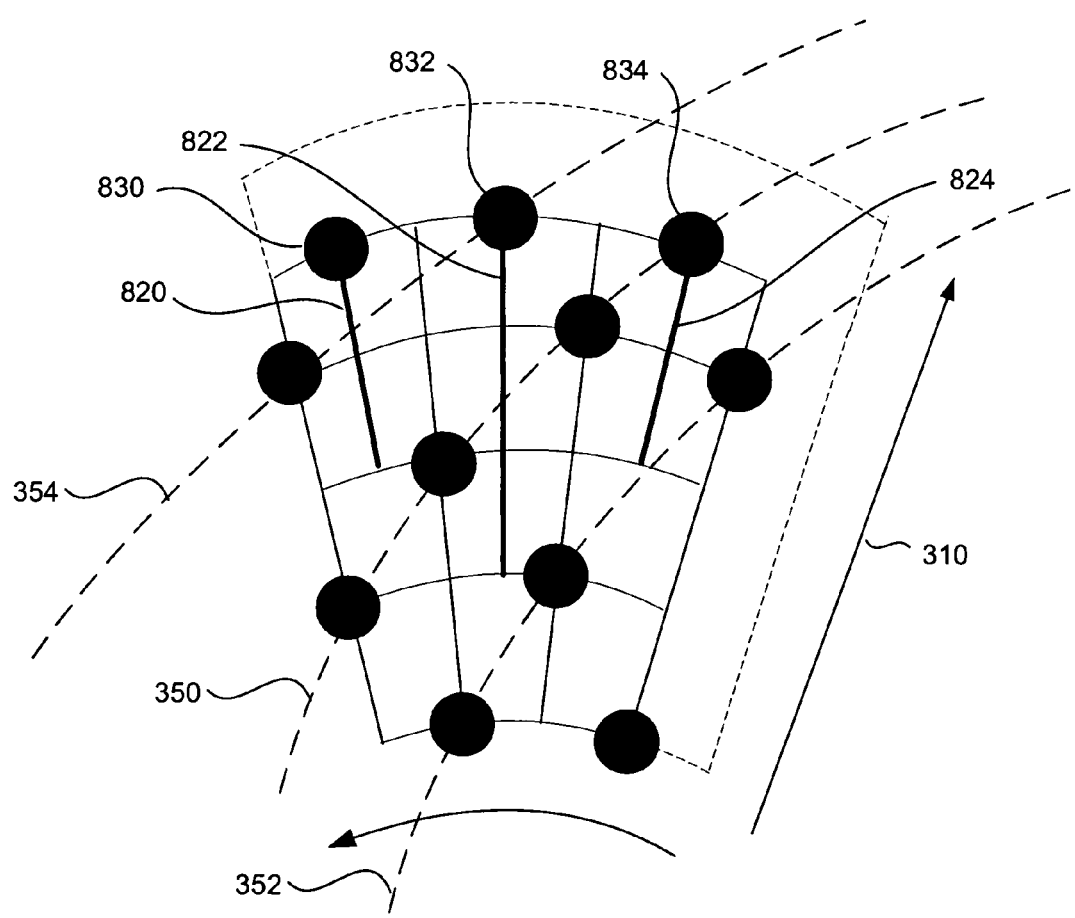
FIG. 8 represents a polar halftone cell having a screen pattern in accordance with a third embodiment of the present invention.

By way of example, a polar halftone cell pattern screen is shown by the dark dots in FIG. 3, illustrating a 50% dot fill pattern. In the present invention, polar halftone cell patterns are fashioned from the available intersection points of spokes and arcs contained within each cell 300. However, polar halftone cell patterns ("polar screens") can be any combination of dot patterns from among all available spoke and arc intersection points within any defined polar cell. By way of another example, polar screens can be fashioned to add more spokes 820~824 in cell regions further from the disc media center, as shown in FIG. 8; this would have the effect of allowing for more evenly spaced dots 830~834 along an outer arc of a polar halftone cell.

Figure 7:
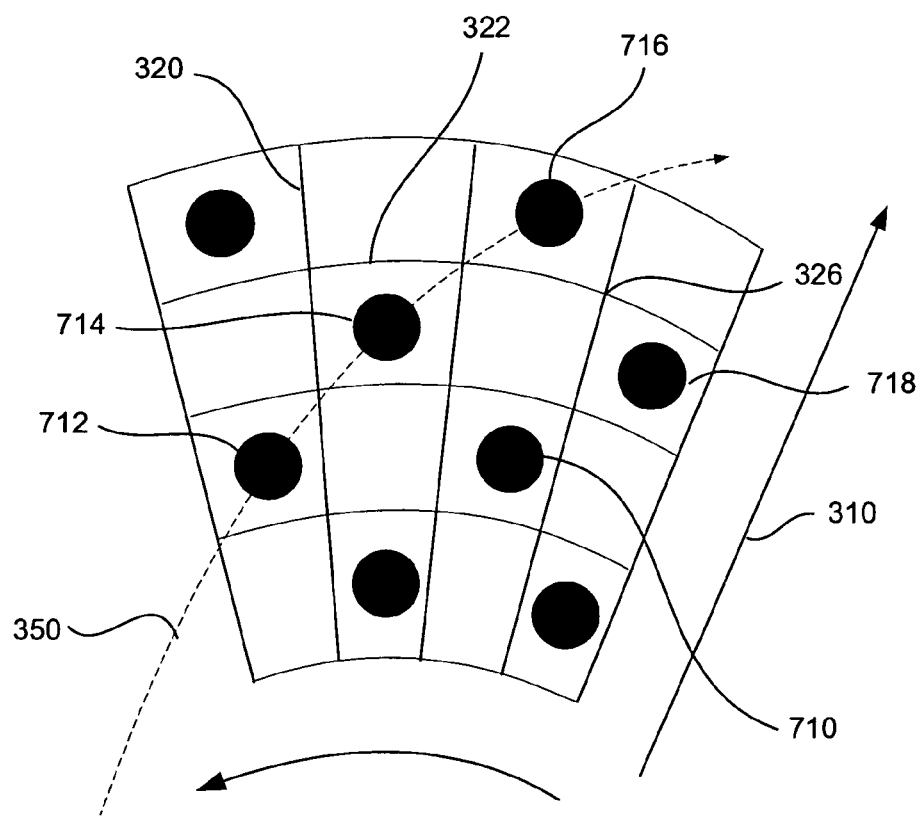
FIG. 7 represents a polar halftone cell having a screen pattern in accordance with a second embodiment of the present invention.

By way of another example, polar screens, can be defined so as to place dot positions 710~718 inside each segment of the cell by appropriate coordinate transform as shown in FIG. 7; this would allow using patterns similar to Cartesian halftones within polar halftone cells.

Figure 9:
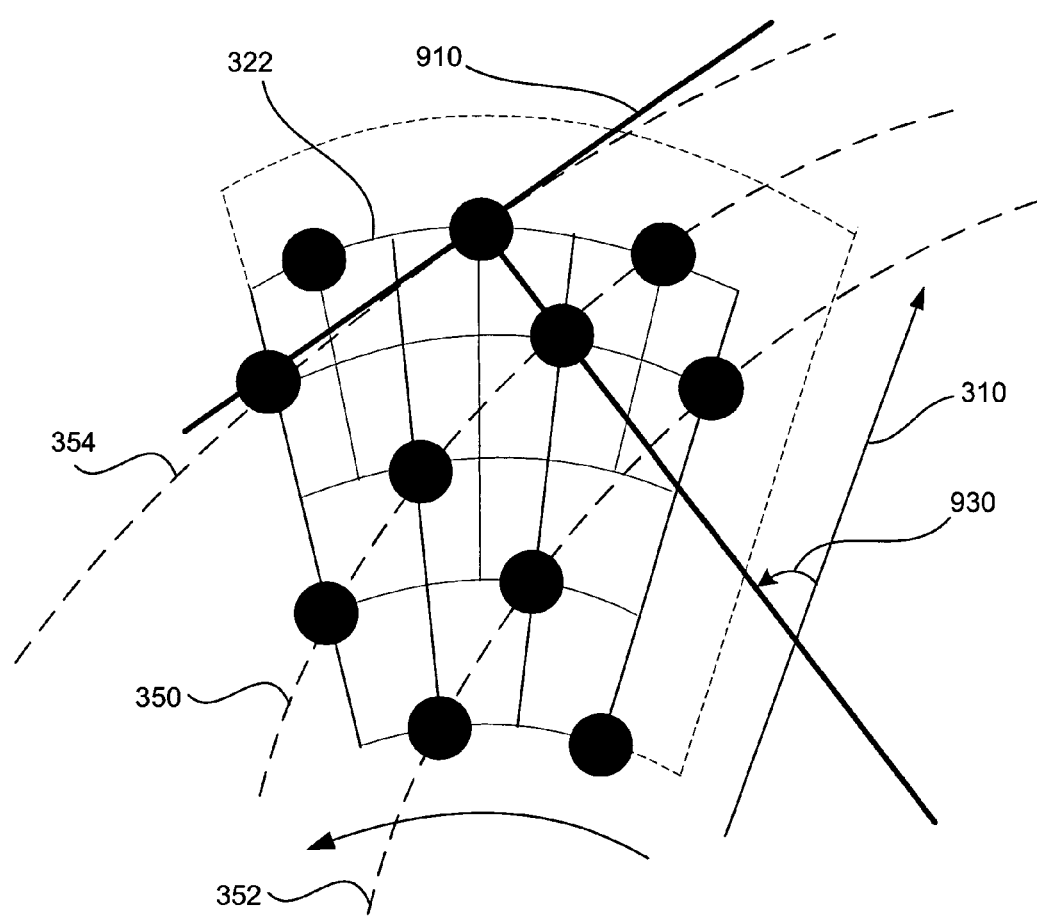
FIG. 9 represents a polar halftone cell having a screen pattern in accordance with a fourth embodiment of the present invention.

By way of yet another example, cell pattern polar screens may be fashioned from sampling along polynomial curves 350~354 (FIG. 8) relative to the center of spinning media. By way of another example, polar screens may be defined by their respective tangent 910 positioned at some angle 930 relative to a radial spoke 310 as shown in FIG. 9; alternately the tangent could be of the boundary of a cell arc 322; either of these methods would describe a polar screen curve to any arbitrary curving component relative to a polar halftone cell, regardless of the point of origin center of the media.

Cell screen patterns are adjusted and chosen to achieve the desired halftone image quality effect and to minimize distortion in the polar domain during radial printing. By way of contrasting and comparison, halftone cell shapes within Cartesian space are regular polygons, wherein each side is a straight line, whereas halftone cell shapes within polar space are characterized by straight lines (spokes) and curves (arcs). Cartesian halftones are typically parallelogram shaped. Polar halftone cell patterns are typically wedge-shaped.

Spacing the polar halftones cells equidistant in both the radial and annular directions enables production of more distortion-free polar halftones for any given intensity across the entire printable media 210 surface. To illustrate mathematically, assuming that the spacing between any two cell-width rings is j at any given radius r, then the circumference of the first ring is 2*pi*r and the circumference of the second ring is 2*pi*(r+j). Hence the difference in the circumference on each successive ring is 2*pi*j.

Figure 1:
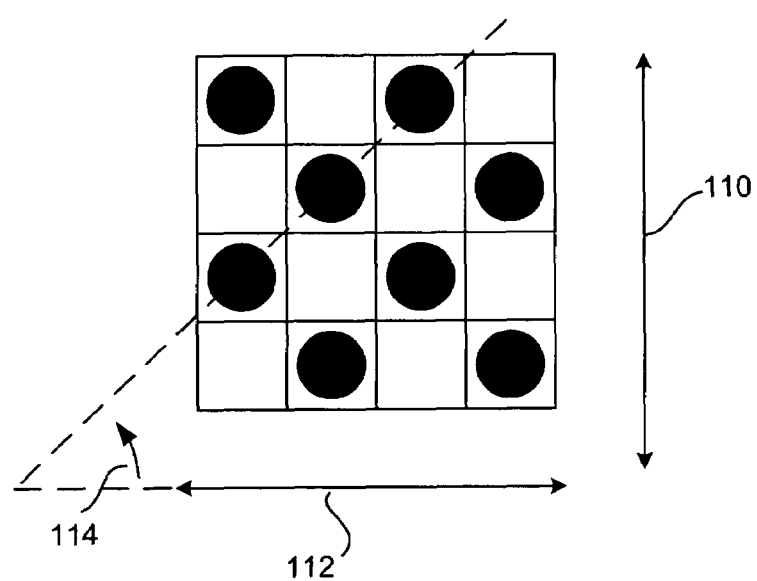
FIG. 1 represents a conventional Cartesian halftone with a 4×4 cell-size.
Figure 4A:
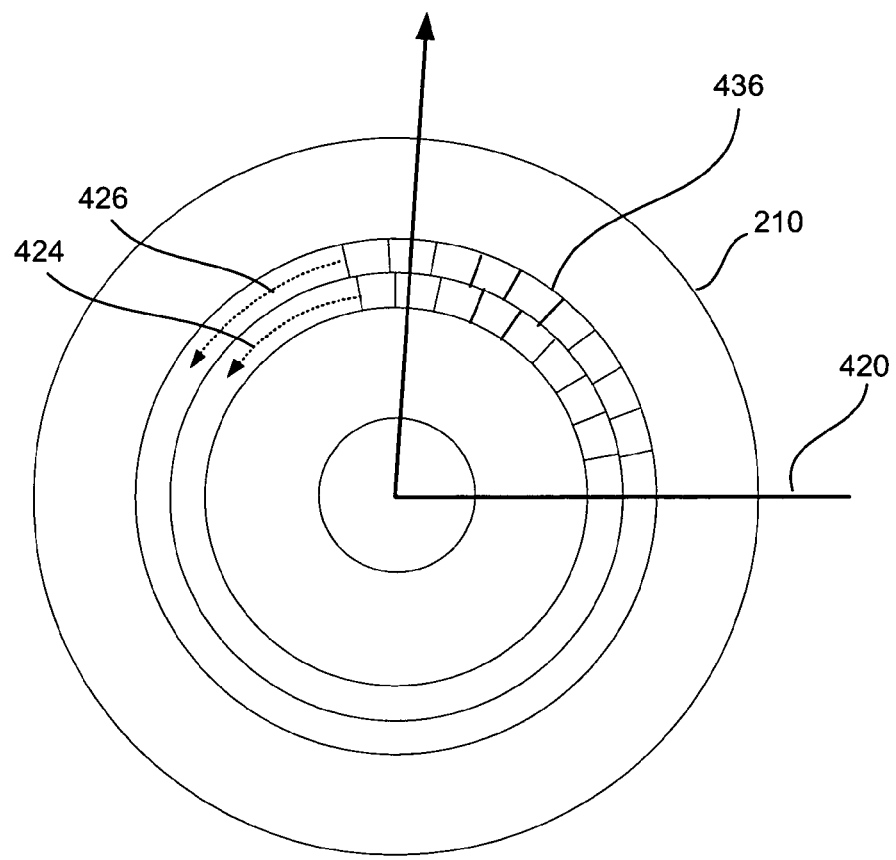
FIG. 4 represents arrangement of adjacent polar halftone cells in accordance with one embodiment of the present invention.
Figure 4B:
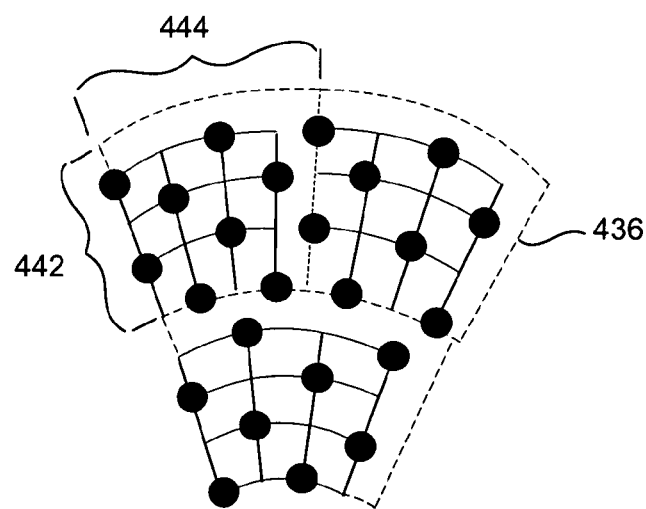
Figure 5:
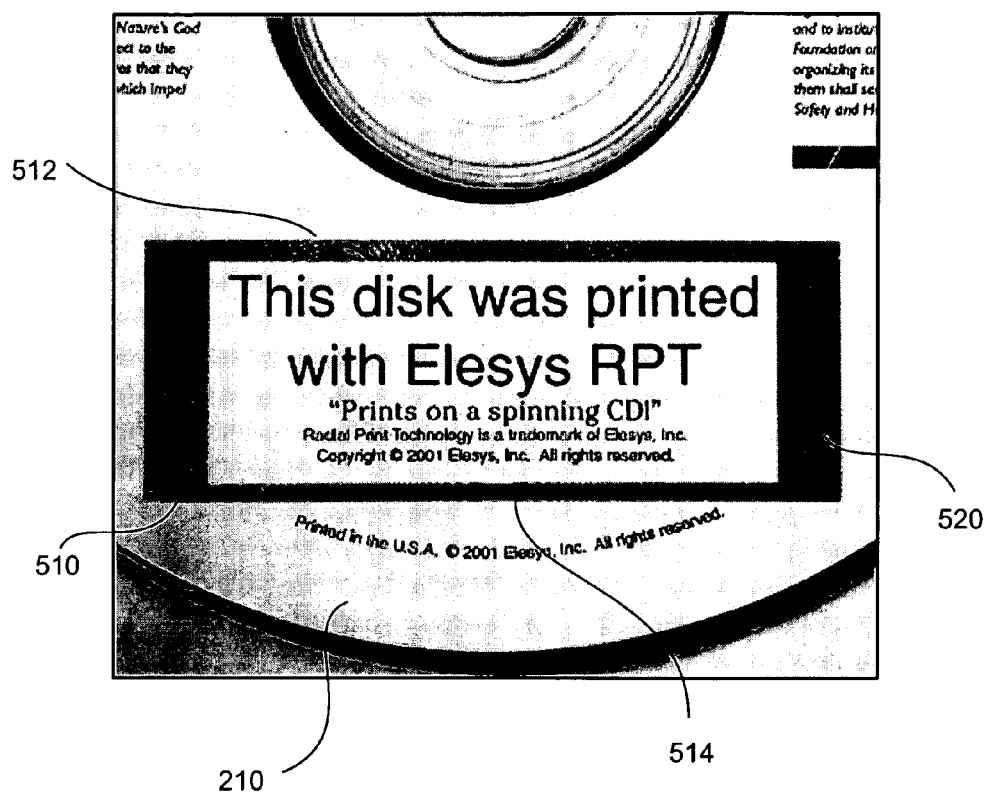
FIG. 5 is a photo of an actual radial-printed disc showing Cartesian halftone and Moiré distortions produced by conventional half-tone techniques.

By way of contrast, in the widely practiced art of using halftones in conventional printers, halftones are often stated in the natural Cartesian coordinate system with the X-axis and Y-axis directions orthogonally aligned, sampled along a halftone screen angle, shown as 114 of FIG. 1. However when viewed in the polar coordinate system, spokes will not linearly line up with the dots from ring to ring in the radially increasing direction due to the increasing dot density as cells are positioned outward. This is stated mathematically using arbitrary units as follows:

Referring to FIGS. 4a~4b, assume a cell has height j 442 radially (assuming that the spacing between any two cell rings 424 and 426 is j) and k wide 444 circumferentially, where k=j, initially. When placing this cell on spokes and rings, the number of cells increases by 2*pi per each ring. Since this is a non-integral number, the effective "width" of the cell must be slightly adjusted larger such that the number of cell "widths" or cell size per entire ring circumference is a whole integer. So k>=j in the preferred embodiment of the present invention, since the cell count for each complete subsequent cell ring 426 is increased by a whole integer value of 6, derived by approximately rounding down from the value of 2*pi (about 6.28). Neighboring cells are preferably sized to substantially abut each other about the entire annular circumference, such that there are an integral number of cells comprising each circular ring. As such, an integral number of cell comprise each complete ring; however, each concentric ring consists of increasingly more cells are the radial displacement increases. This has a beneficial effect of creating no discontinuities along the annual direction, especially when the beginning and ending ring cells abut one another; the cells align with their neighboring cells along the annular directions, as shown in cell rings 424 and 426.

Figure 6:
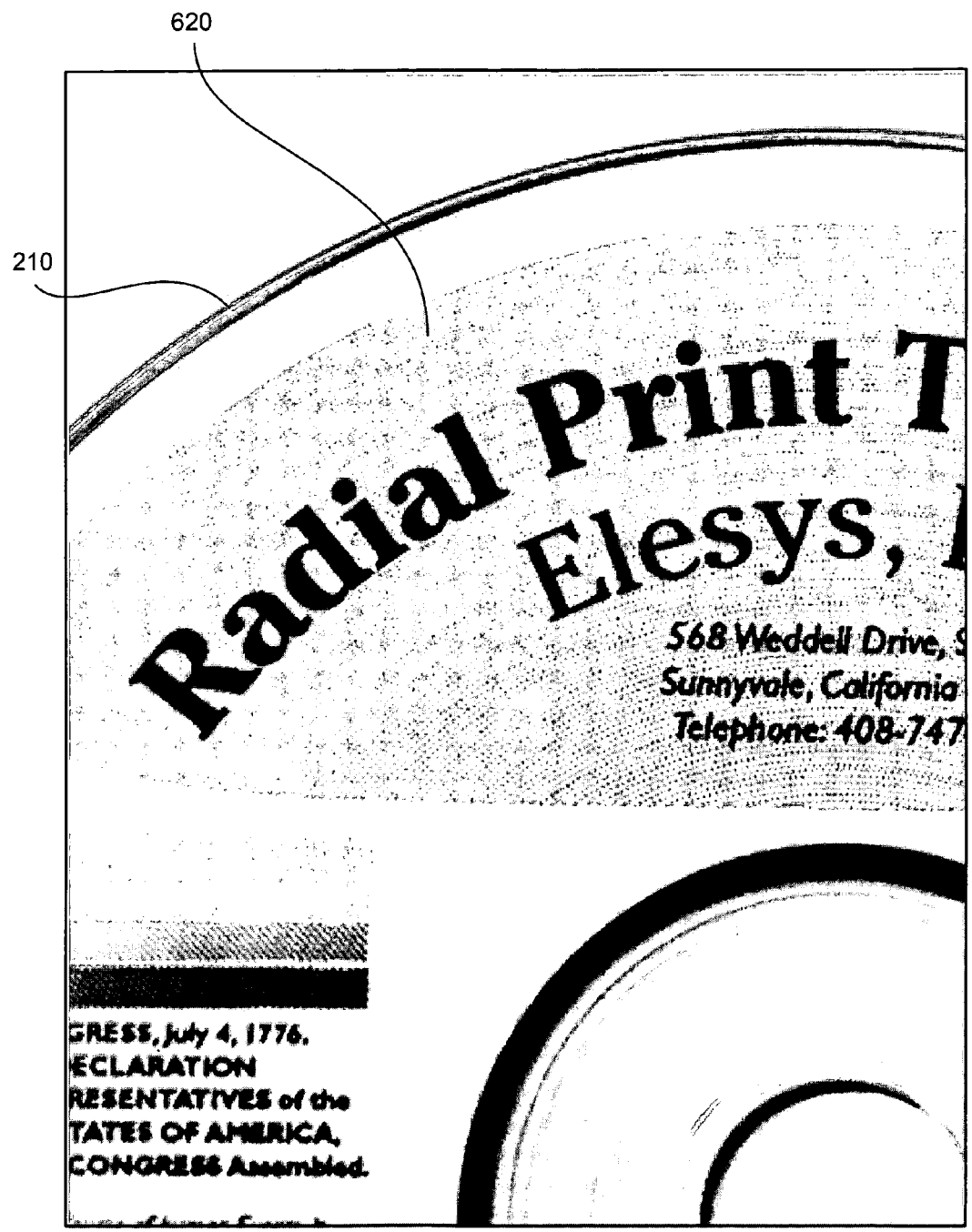
FIG. 6 is a photo of an actual radial-printed disc showing Polar halftones with little or no distortions produced by half-tone techniques of the present invention.

One side effect of using an integral number of cells per ring is that the cells usually cannot align along spokes in the radial direction. This method may introduce strong annular discontinuity patterns that can be observed between each concentric ring boundary depending on the polar halftone cell pattern used. However, halftone images may be empirically derived that blend polar halftone ring effects and minimize the ring-to-ring image discontinuities. By observation as shown in FIG. 6, the resulting image quality is not objectionable as long as the polar halftone cell patterns are chosen to minimize a pronounced visual tendency to emphasize "ring" patterns in the halftone output 620. The photographed print sample of FIG. 6 shows an enlargement of output printed at 300 DPI using the 4×4 polar halftone of TABLE 1 below.

In the preferred embodiment, polar halftone screens are precomputed so as to transform Cartesian images into corresponding polar image elements (pixel dots) to enable radial printing. FIG. 11 illustrates a procedure for computing the polar halftone screen, which combines the polar transform inherently in the process. Referring to FIGS. 10~11, the circular image area on the media 210 is divided radially into a plurality of cell-width number of bands 1012, shown as operation 1110 of FIG. 11a. Then for the plurality of all bands (1112), the following sequence is executed:

divide the image points into an integral number of polar halftone cells per band in operation 1116;

then for the plurality of all cells for each band (1118), polar transform equations are used to evaluate each polar cell dot position in the polar halftone cell screen pattern, as illustrated in operation of FIG. 11b: compute radial position of the band containing the cell in operation 1152; mask the Cartesian image with overlay of the physical pen nozzle pattern, for each color in operation 1154; calculate the polar cell boundary in terms of annular angle offset from reference 420 in operation 1156; and calculate the dot position radial and annular angle offset within the polar cell in operation 1158;

get the intensity of the dot under the polar halftone cell screen position in operation 1122;

assign polar halftone cell pattern values, on a dot-by-dot basis, to the target polar image, based upon the image dot intensity in operation 1124;

dispense ink objects radially on circular spinning media in operation 1126;

finally, the radially printed media is complete in operation 1132.

Figure 10A:
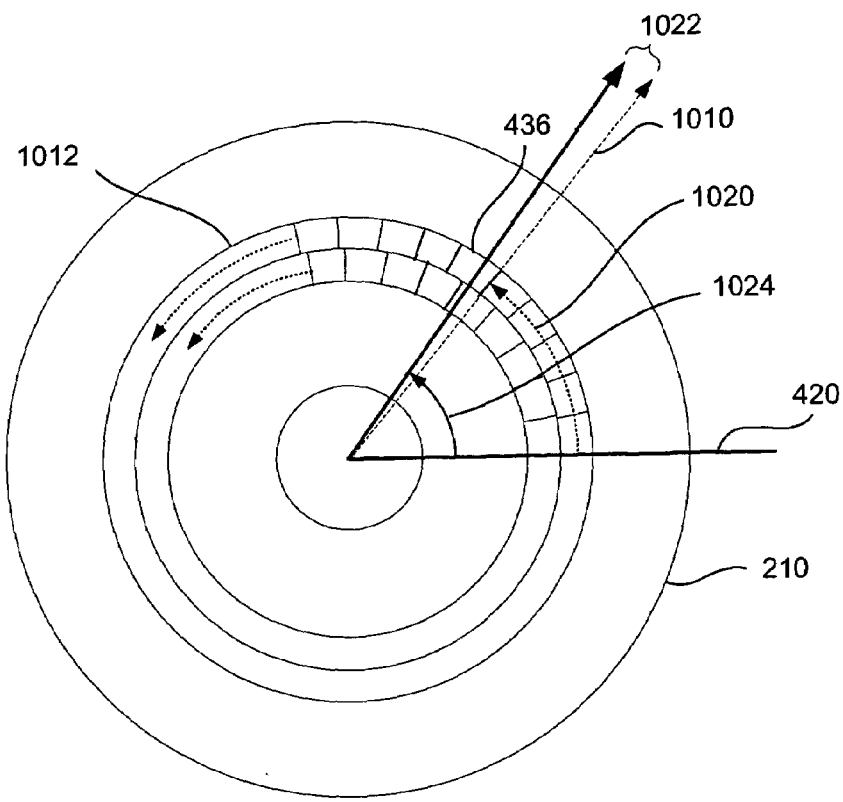
FIG. 10a is a diagrammatic representation of a media upon which a plurality of polar half-tone cell has been formed.
Figure 10B:
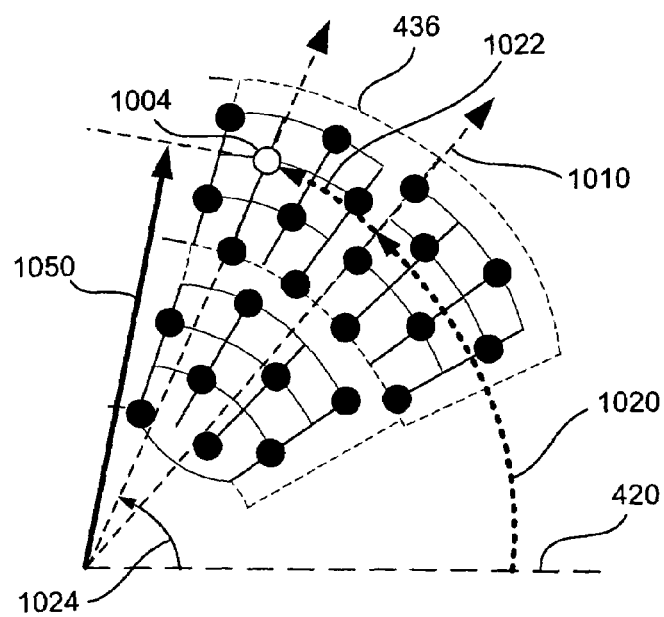
FIG. 10b is a diagrammatic representation of a plurality of screen dot positions.

By way of example, the polar halftone screen is applied mathematically as follows in 1150 of FIG. 11b: Referring to FIGS. 10a~10b, the edge of a polar cell 436 is referenced from annular reference zero mark 420 by angle 1020. Printable dot 1004 is offset angle 1022 into the cell 436 and is located at radius 1050 from the center of the media. Thus printable cell dot 1004 offset into the cell is calculated by dividing by cell 436 width (k above) with a modulus function, yielding the dot offset 1022. Combining dot offset angle 1022 with the cell offset angle 1010 yields composite offset angle 1024 for any given printable dot 1004. Therefore, applying polar halftone screen 436 to the intensity value of the original image file yields printable dot 1004 position, which is either printed or not, depending on the image intensity value and whether there is an corresponding image with a value at the polar coordinate of r 1050 and theta 1024. For example, when there is an image point present at a particular halftone cell position and the halftone screen pattern indicates that such dot should be printed, an ink object is printed at such cell dot position. Otherwise, if there is not an image point present at the particular halftone cell position or the halftone screen pattern indicates that such dot should not be printed, an ink object is not printed at such cell dot position. In another example, the average intensity value of all of the image dots within a particular halftone cell may be obtained, and a screen pattern is then chosen based on such average intensity.

TABLE 1 below illustrates the polar halftone pattern set comprising sixteen levels of intensity in the preferred embodiment of the present invention. For any desired intensity, halftone cells are chosen to best maximize the distribution of dots in the radial direction along the spokes and minimize emphasis of patterns in the annular "ring" direction. Using a 4×4 cell size, the growth of dots with intensity starts near the center of the cell, then goes to 2 separated dots, one above each other. Next, the gaps are filled in. The process repeats on the next column nearest the center, as seen in TABLE 1.

TABLES 1 and 2 below use the convention of a "1" in the respective row to depict an arc dot being "on," and similarly depict the spoke dot being "on" by a "1" in the respective column. For example, for intensity 1 in TABLE 1, counting from the lower left corner of the cell, spoke 3 in arc 3 is "on." Table 1 depicts a sample polar halftone for the preferred embodiment of the present invention, with emphasis on a pattern to emphasize the spoke direction. On the other hand, TABLE 2 depicts a sample polar halftone with emphasis on a pattern to emphasize the arc direction.

TABLE 1

| A 4 × 4 Polar Halftone with Emphasis on the Spoke Direction | |
|---|---|
| 0000 | intensity 0 |
| 0000 | |
| 0000 | |
| 0000 | |
| 0000 | intensity 1 |
| 0010 | |
| 0000 | |
| 0000 | |
| 0010 | intensity 2 |
| 0000 | |
| 0010 | |
| 0000 | |
| 0010 | intensity 3 |
| 0010 | |
| 0010 | |
| 0000 | |
| 0010 | intensity 4 |

TABLE 1-continued

A 4 × 4 Polar Halftone with Emphasis on the Spoke Direction

| | |
|---|---|
| 0010 | |
| 0010 | |
| 0010 | |
| 0010 | intensity 5 |
| 0110 | |
| 0010 | |
| 0010 | |
| 0110 | intensity 6 |
| 0010 | |
| 0110 | |
| 0010 | |
| 0110 | intensity 7 |
| 0110 | |
| 0110 | |
| 0010 | |
| 0110 | intensity 8 |
| 0110 | |
| 0110 | |
| 0110 | |
| 1110 | intensity 9 |
| 0110 | |
| 1110 | |
| 0110 | |
| 1110 | intensity 10 |
| 1110 | |
| 1110 | |
| 0110 | |
| 1110 | intensity 11 |
| 1110 | |
| 1110 | |
| 1110 | |
| 1110 | intensity 12 |
| 1111 | |
| 1110 | |
| 1110 | |
| 1111 | intensity 13 |
| 1110 | |
| 1111 | |
| 1110 | |
| 1111 | intensity 14 |
| 1111 | |
| 1111 | |
| 1110 | |
| 1111 | intensity 15 |
| 1111 | |
| 1111 | |
| 1111 | |

The polar halftones shown above in TABLE 1 place as much resolution as possible in the radial spoke direction. The actual results at 300 DPI radial printing resolution is shown in FIG. 6. By observation, using the TABLE 1 halftone, the human eye is less likely to perceive rings and more likely to see a uniform pattern of dots.

By way of a second embodiment, TABLE 2 illustrates a polar halftone pattern set with a more pronounced ring pattern effect in the resulting printed output. This cell pattern is designed to start at the center of each cell and fill out as more intensity bits are added for higher density values. Since a concentration for halftone dots is in the center, a ringing pattern is more visually apparent at some densities.

TABLE 2

A 4 × 4 Polar Halftone with Emphasis on the Arc Direction

| | |
|---|---|
| 0000 | intensity 0 |
| 0000 | |
| 0000 | |
| 0000 | |
| 0000 | intensity 1 |
| 0010 | |

TABLE 2-continued

A 4 × 4 Polar Halftone with Emphasis on the Arc Direction

| | |
|---|---|
| 0000 | |
| 0000 | |
| 0000 | intensity 2 |
| 0110 | |
| 0000 | |
| 0000 | |
| 0000 | intensity 3 |
| 0110 | |
| 0010 | |
| 0000 | |
| 0000 | intensity 4 |
| 0110 | |
| 0110 | |
| 0000 | |
| 0010 | intensity 5 |
| 0110 | |
| 0110 | |
| 0000 | |
| 0010 | intensity 6 |
| 1110 | |
| 0110 | |
| 0000 | |
| 0010 | intensity 7 |
| 1110 | |
| 0110 | |
| 0100 | |
| 0010 | intensity 8 |
| 1110 | |
| 0111 | |
| 0100 | |
| 0110 | intensity 9 |
| 1110 | |
| 1111 | |
| 0100 | |
| 0110 | intensity 10 |
| 1110 | |
| 1111 | |
| 0110 | |
| 0110 | intensity 11 |
| 1111 | |
| 1111 | |
| 0110 | |
| 1110 | intensity 12 |
| 1111 | |
| 1110 | |
| 0110 | |
| 1111 | intensity 13 |
| 1111 | |
| 1111 | |
| 0110 | |
| 1111 | intensity 14 |
| 1111 | |
| 1111 | |
| 0111 | |
| 1111 | intensity 15 |
| 1111 | |
| 1111 | |
| 1111 | |

By way of a third embodiment, TABLE 3 below illustrates a polar halftone pattern that emphasizes resolution in the radial spoke direction, but produces better images at 600 DPI radial printing resolution.

TABLE 3

A 6 × 6 Polar Halftone with Emphasis on the Spoke Direction

| | |
|---|---|
| 000000 | intensity 0 |
| 000000 | |
| 000000 | |
| 000000 | |
| 000000 | |
| 000000 | |

TABLE 3-continued

A 6 × 6 Polar Halftone with Emphasis on the Spoke Direction

| Pattern | Intensity |
|---|---|
| 000000 000100 000000 000000 000100 000000 | intensity 1 |
| 000100 000100 000000 000100 000000 000100 | intensity 2 |
| 000100 000100 000100 000100 000100 000100 | intensity 3 |
| 000100 001100 000100 001100 000100 001100 | intensity 4 |
| 001100 001100 001100 001100 001100 001100 | intensity 5 |
| 001100 001100 011100 001100 011100 001100 | intensity 6 |
| 011100 011100 001100 011100 001100 011100 | intensity 7 |
| 011100 011100 011100 011100 011100 011100 | intensity 8 |
| 011100 011110 011100 011110 011100 011110 | intensity 9 |
| 011110 011110 011110 011110 011110 011110 | intensity 10 |
| 111110 011110 111110 011110 111110 011110 | intensity 11 |
| 111110 111110 011110 111110 111110 111110 | intensity 12 |
| 111110 111111 111110 111110 111110 111111 | intensity 13 |
| 111110 111111 111110 111111 111110 111111 | intensity 14 |
| 111111 111111 111111 111111 111111 111111 | intensity 15 |

In summary, these embodiments implement only a few of many possible embodiments for polar halftones, as there is a plethora of ways to select the turning on of dots within the halftone cell for each intensity level. Many other combinations and permutations of the number of spokes and arcs are possible, each contributing differing observable halftone effects and varying results. For example, the number of spokes and arcs need not be the same as cell 4×4 or 6×6, such as a 6×4, 3×6, or 6×8. Similarly, other effects can be achieved by grouping polar halftone cells in groups of patterns or of varying sizes. The human eye response to these differing cell shapes will vary with the intended result or application. Thus, one may be more suitable than another for any given radial printing application.

The exemplary concept and novel use of polar halftones as defined in the present invention illustrate the overall principle and application of the more general solution for printing with halftones during radial printing. Therefore, the described embodiments should be taken as illustrative only and not restrictive, and the invention should not be limited to the details given herein but should be defined by the following claims and their full scope of equivalents.

What is claimed is:

1. A method of printing an image onto a rotating media using a plurality of half-tone cells, comprising:
   providing a plurality of image points;
   dividing the rotating media into a plurality of annular bands along a radial direction of the rotating media, the annular bands being an integral number and each band having a width equal to a half-tone cell and being bound by two arcs;
   dividing each band into an integral number of half-tone cells so that each half-tone cell is bound by two opposing arcs and two opposing spokes originating from a center of the rotating media, wherein each half-tone cell has an associated plurality of screen dot patterns, and each screen dot pattern is associated with a specific intensity level; and
   for each selected half-tone cell, determining which image points are associated with the selected half-tone cells, selecting a screen dot pattern based on one or more intensity values of the associated image points, and dispensing ink objects onto the rotating media based on the selected screen dot pattern.

2. A method as recited in claim 1, wherein the operation of dispensing ink objects on the rotating media within a selected half-tone cell is further based on a position of each image point associated with the selected half-tone cell relative to each dot of the selected half-tone cell's screen dot pattern.

3. A method as recited in claim 2, wherein each dot of each screen pattern is arranged at an intersection of an arc and a spoke.

4. A method as recited in claim 3, wherein determining which image points are associated with the selected half-tone cell includes determining which image points fall on a one of the dots of the selected half-tone cell's screen dot pattern.

5. A method as recited in claim 4, wherein dispensing ink objects onto the rotating media includes for each dot of the selected half-tone cell's screen dot pattern, dispensing ink at the each dot when an image point actually falls on such dot and when the selected screen dot pattern indicates that an ink object may be dispensed at such dot.

6. A method of printing an image onto a rotating media using a plurality of half-tone cells, comprising:

providing a plurality of Cartesian based image points;

dividing the image points into an integral number of polar cell-width bands along a radial direction of the rotating media;

within each band, dividing the image points into an integral number of polar half-tone cells, wherein each half-tone cell has a plurality of screen patterns each having a plurality of screen positions; and for each half-tone cell,
transforming the Cartesian based image points into polar based image points,
evaluating a position of each polar based image point with respect to the screen positions within the each half-tone cell,
obtaining an intensity of each polar based image point located at each screen position within the each half-tone cell,
for each screen position within the each half-tone cell, selecting a screen pattern based on the obtained intensity of the polar image point at such screen position, and
dispensing ink objects radially onto the rotating media based on the selected screen pattern at each screen position with the each half-tone cell.

7. A method as recited in claim 6, wherein the evaluation of the position of each polar based image point with respect to the screen positions includes:

computing a radial position of the band containing the each half-tone cell;

masking the Cartesian based image points with overlay of physical pen nozzle pattern by color;

determining a polar cell boundary annular angle offset; and determining the radial position and annular angle offset of each polar based image point within the half-tone cell.

8. A radial printing system for printing onto a rotating media, the system comprising:

a computer imaging system configured to:
receive a plurality of image points;
divide the rotating media into a plurality of annular bands along a radial direction of the rotating media, the annular bands being an integral number and each band having a width equal to a half-tone cell and being bound by two arcs,
divide each band into an integral number of half-tone cells so that each half-tone cell is bound by two opposing arcs and two opposing spokes originating from a center of the rotating media, wherein each half-tone cell has an associated plurality of screen dot patterns, and each screen dot pattern is associated with a specific intensity level, and
for each selected half-tone cell, determine which image points are associated with the selected half-tone cells, select a screen dot pattern based on one or more intensity values of the associated image points, and output a printing signal for dispensing ink objects onto the rotating media based on the selected screen dot pattern; and a head assembly coupled to the computer imaging system for outputting ink objects onto the rotating media in response to the printing signal received from the computer imaging system.

9. A radial printing system for printing onto a rotating media, the system comprising:

a computer imaging system operable to:
receive a plurality of Cartesian based image points;
divide the image points into an integral number of polar cell-width bands along a radial direction of the rotating media;
within each band, divide the image points into an integral number of polar half-tone cells, wherein each half-tone cell has a plurality of screen patterns each having a plurality of screen positions; and for each half-tone cell,
transform the Cartesian based image points into polar based image points,
evaluate a position of each polar based image point with respect to the screen positions within the each half-tone cell,
obtain an intensity of each polar based image point located at each screen position within the each half-tone cell,
for each screen position within the each half-tone cell, select a screen pattern based on the obtained intensity of the polar image point at such screen position, and
output a printing signal based on the selected screen pattern at each screen position with the each half-tone cell, and a head assembly coupled to the computer imaging system for outputting ink objects onto the rotating media in response to the printing signal received from the computer imaging system.

* * * * *